3,034,881
METHOD FOR KILLING WEED SEEDS IN SOIL
Kenneth P. Dorschner and Joe R. Willard, Middleport, N.Y., assignors to FMC Corporation, a corporation of Delaware
No Drawing. Filed Dec. 9, 1957, Ser. No. 701,331
3 Claims. (Cl. 71—2.7)

This invention relates to a novel method and composition for the treatment of soil. More particularly this invention relates to a soil drenching seed toxicant and method of applying the same.

It has become increasingly common to treat soil with chemical substances to destroy harmful insects, weeds and other undesirable bodies. A method which is in particular favor is that of drenching the soil with a fumigant prior to seeding. This method is not only applicable in the field but is also particularly adapted for application to plant seed beds.

Many vegetable and agronomic crops are not directly seeded in the field, but instead are established from seedling transplants. This practice is generally followed for many of the cole crops and for tobacco, tomatoes, peppers, lettuce, etc. Ultimate maximum yields are often dependent upon the vigor of the seedlings produced in the seed bed. Severe weed infestations in a seed bed can greatly reduce the vigor of the desired seedlings through their competition for moisture, nutrients and light. Control of these weeds by mechanical or hand labor has proven a tedious, laborious and expensive operation. It is for these reasons that the control or kill of weed seeds in plant seed beds prior to, or just during germination, by chemical means is particularly desirable.

An ideal herbicide for use in the field or in plant seed beds should possess the following properties: high toxicity to a wide variety of dormant or germinating weed seeds; residual effectiveness only until the weed seeds are killed and leave no toxic residues remaining in the soil at the time of seeding; be water soluble to aid in penetration of the active ingredient; be effective under a wide range of soil and environmental temperature and moisture conditions, and be easy to handle, especially with reference to toxicity, irritability and lachyrmatory fumes.

It is an object of this invention to provide a novel drenching composition possessing the properties mentioned above. It is another object to provide a method for applying the composition to the soil. These and other objects will become readily apparent from the following description and claims.

According to this invention there is provided a novel herbicidal composition and method for controlling undesirable vegetation which comprises treating the soil with a sufficient concentration of 2-propyn-1-ol, hereinafter called propargyl alcohol, to induce kill of the weed and plant seeds or vegetative reproductive organs present in said soil.

It has been discovered that propargyl alcohol is an excellent herbicide and is particularly adapted for use as a soil drench weed-seed toxicant. It is effective under a wide range of edaphic and microclimatic conditions and is particularly effective against such weed species as Jerusalem oak (*Chenopodium botrys*) which is resistant to many other herbicides.

Propargyl alcohol may be applied directly to the soil to be treated or it may be applied in a liquid carrier. It has proven particularly effective as a soil drench in an aqueous carrier. Propargyl alcohol may also be combined with a nematocide such as ethylene dibromide which is particularly effective against nematodes. When ethylene dibromide is employed an emulsifier should be incorporated in the concentrate. The emulsifiers utilized in the emulsifiable concentrates may be either anionic or non-anionic, such as polyoxyethylene condensate products of alkyl phenols. Particularly advantageous is a polyethylene ester of fatty acids having from 12 to 20 atoms in the chain length.

When propargyl alcohol is to be applied in aqueous solution, it has been found particularly effective to apply it at a dosage rate of three quarts per 100 square yards applied in 100 gallons of water i.e., approximately 250 pounds of propargyl alcohol per acre. However, the dosage to be applied may be varied over wide limits depending on the type of soil, temperature, humidity, weed species to be killed, etc. These factors are, of course, well within the knowledge of those persons skilled in the art.

When an emulsifiable concentrate is to be prepared a composition comprising about 70 to 85% propargyl alcohol, 8 to 15% of a 90 to 99% solution of ethylene dibromide in petroleum naphtha and 2 to 10% of a polyoxyethylene ester of fatty acids has been found to be particularly effective. The constituents of this composition may, of course, be varied over wide limits depending e.g. on whether the soil is more heavily infested with nematodes than with weed seeds or vice versa. This composition may then be dispersed in water and applied to the soil as a drenching composition.

The composition of this invention is preferably applied to the soil at least 10 to 12 days before seeding. Preferably the plant bed should be of good tilth at the time of treatment. Any equipment suitable for drenching will be satisfactory for applying the composition. A tractor, truck or trailer-mounted 55-gallon drum with a 2-inch pipe the width of the bed (preferably aluminum for easy handling), having ⁹⁄₆₄ inch holes spaced ½ inch apart and mounted horizontally behind and to one side of the tractor will work well and will expose the operator to a minimum of fumes.

Propargyl alcohol has been found to be particularly effective against such species of broadleaves as pigweed (*Amaranthus retroflexus*), mustard (*Brassica juncea*), lettuce (*Lactuca sativa*) and grasses such as ryegrass (*Lolium* spp.).

The following examples are given as illustrations of the invention and it is not intended that the scope of the invention be restricted thereto.

EXAMPLE I

Table I below compares the effectiveness of propargyl alcohol as a herbicide with other structurally similar compounds.

*Table I*

| Chemical Compound | Rate in pounds per acre | Percent Kill of Plant Seeds | |
|---|---|---|---|
| | | Broadleaves [1] | Grasses [2] |
| 2-Butene-1,4-diol | 50 | 10 | 0 |
| 2-Butyne-1,4-diol | 50 | 25 | 0 |
| Propargyl alcohol | 50 | 99 | 90 |
| Dimethallyl sulfide | 100 | 0 | 0 |
| Allyl Chloride | 240 | 0 | 0 |
| Dimethallyl disulfide | 100 | 0 | 0 |
| Methallyl alcohol | 240 | 0 | 0 |
| Dimethallyl tetrasulfide | 100 | 0 | 0 |
| Methallyl chloride | 240 | 0 | 0 |
| Dimethallyl tri-thiocarbonate | 100 | 0 | 0 |
| Allyl bromide | 240 | 25 | 25 |
| Methallyl isothiocyanate | 100 | 0 | 75 |
| Methallyl mercaptan | 100 | 0 | 0 |
| Phenyl allyl sulfide | 100 | 0 | 0 |
| Benzyl allyl sulfide | 100 | 0 | 0 |
| 1,4-Dibromobutene-2 | 100 | 0 | 0 |

[1] Broadleaves:
    Rough pigweed (*Amaranthus retroflexus*)
    Mustard (*Brassica juncea*)
    Lettuce (*Lactuca sativa*)
[2] Grass: Ryegrass (*Lolium* spp.)

EXAMPLE II

Table II below illustrates the effectiveness of propargyl alcohol as an herbicide for use in greenhouses where the seedlings may be grown prior to transplanting.

Table II

| Rate in pounds per acre | Percent Weed Seed Kill [1] | |
|---|---|---|
| | Broadleaves | Grass |
| 25 | 99 | 95 |
| 50 | 99 | 99 |
| 100 | 100 | 100 |
| 150 | 100 | 100 |
| 200 | 100 | 100 |
| 400 | 100 | 100 |

[1] Only 100% kill of all seeds considered satisfactory under greenhouse conditions.

EXAMPLE III

Table III below illustrates the compatability and effectiveness of a composition comprising 83% and 13% of propargyl alcohol and ethylene dibromide respectively as an herbicidal and nematocidal formula.

Table III

| Rate in pounds per acre | Percent Weed Seed Kill | |
|---|---|---|
| | Broadleaves | Grass |
| 50 | 100 | 99 |
| 100 | 100 | 100 |
| 400 | 100 | 100 |

EXAMPLE IV

Frequently the storage organs or underground root stocks of perennial plants are much more difficult to control than are the seeds of the same species. A composition comprising propargyl alcohol and ethylene dibromide, identical to that described in Example III, was tested against the tubers of nutgrass (*Cyperus rotundus*). The tubers employed were planted at various soil depths and the results of these tests are set forth in Table IV below.

Table IV.—Effect of Propargyl Alcohol on Underground Vegetative Reproductive Organs

| | Rate in pounds per acre | No. of sprouted tubers | | | Percent Control | | |
|---|---|---|---|---|---|---|---|
| | | 1½″ deep | 2½″ deep | 3″ deep | 1½″ deep | 2½″ deep | 3″ deep |
| Propargyl alcohol and ethylene dibromide | 100 | 1 | 6 | 8 | 90 | 40 | 20 |
| | 400 | 0 | 0 | 2 | 100 | 100 | 80 |
| None | | 10 | 10 | 10 | 0 | 0 | 0 |

EXAMPLE V

Six areas were treated with propargyl alcohol at rates equal to 400 pounds per acre. For purposes of comparison six other areas of equal size were treated with allyl alcohol at rates equal to 400 pounds per acre. Commencing three days after application of the chemicals the soil in one area of each of the alcohol series was thoroughly remixed and seeded to the following plant species: oats (*Avena sativa*), lima beans (*Phaseolus lunatus*), corn (*Zeamays*), cotton (*Gossypium hirsutum*) and tobacco (*Nicotiana tobacum*).

After each subsequent two-day interval, an additional area from each series was remixed and planted. This technique enabled the soil residual or longevity of allyl and propargyl alcohols in greenhouse soils to be compared. The results are given in Table V below. These data indicate that propargyl alcohol is appreciably less volatile than allyl alcohol and remains an active toxiphore longer than allyl alcohol.

Table V.—Residual Capacity of Allyl and Propargyl Alcohols

ALLYL ALCOHOL

| Test crops | 3 Days* | 5 Days | 7 Days | 9 Days | 11 Days | 13 Days |
|---|---|---|---|---|---|---|
| Tobacco | +− | ++ | ++ | ++ | ++ | ++ |
| Oats | −− | ++ | ++ | ++ | ++ | ++ |
| Corn | +− | ++ | ++ | ++ | ++ | ++ |
| Cotton | +− | ++ | ++ | ++ | ++ | ++ |
| Lima Beans | +− | ++ | ++ | ++ | ++ | ++ |

PROPARGYL ALCOHOL

| Tobacco | −− | +− | ++ | ++ | ++ | ++ |
| Oats | −− | −− | +− | ++ | ++ | ++ |
| Corn | +− | +− | ++ | ++ | ++ | ++ |
| Cotton | −− | −− | ++ | ++ | ++ | ++ |
| Lima Beans | −− | −− | ++ | ++ | ++ | ++ |

\* Day Nos. refer to days lapsing after chemical application.
++ Seedlings have emerged and appear vigorous as the untreated controls.
+− Seedlings have emerged but may be injured or reduced in number.
−− Seedlings have not emerged.

EXAMPLE VI

Propargyl alcohol and allyl alcohol were compared as weed seed toxicant drenches under field conditions. Each drench was prepared by dilution with water. Application was made equivalent to 1 gallon of diluted drench per square yard of seed bed. Tobacco was seeded to the treated bed about one month following chemical application. Data on weed seed kill and tobacco seedling emergence are recorded in Table VI below. This table shows that propargyl alcohol at ½ to ⅔ the application rate of allyl alcohol effects greater weed kill than allyl alcohol and also allows enhanced tobacco seedling development.

Table VI.—Field Performance of Propargyl Alcohol and Allyl Alcohol

| Treatment | Dosage/Qts. 100 Sq. Yds. | Plants/Sq. Ft.[1] | |
|---|---|---|---|
| | | Weeds | Tobacco [2] |
| Propargyl alcohol | 4 | [3] 1.3 | 19.3 |
| Do | 3 | [3] 2.3 | 20.6 |
| Allyl alcohol | 6 | [3] 3.3 | 16.0 |
| Untreated | | [4] 49.6 | 0 |

[1] Average 3 Replicates.
[2] Transplantable Plants.
[3] Toad Flax (*Linaria vulgaris*), Dog Fennel (*Anthemis cotula*).
[4] Toad Flax, Dog Fennel, Various annual grasses, Ragweed (*Ambrosia artemisifolia*) and Lambsquarters (*Chenopodium album*).

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A method of killing weed seeds in the soil which comprises treating the soil with a sufficient concentration of propargyl alcohol in an inert adjuvant to induce kill of the weed seeds present in said soil.

2. A method according to claim 1 wherein said composition is sprayed on the soil to be treated.

3. A method according to claim 1, wherein said adjuvant is water.

(References on following page)

References Cited in the file of this patent

UNITED STATES PATENTS

| | | |
|---|---|---|
| 2,106,181 | Kreimeier | Jan. 25, 1938 |
| 2,396,513 | Jones | Mar. 12, 1946 |
| 2,473,984 | Bickerton | June 21, 1949 |
| 2,626,862 | Zimmerman et al. | Jan. 27, 1953 |
| 2,668,758 | Roos et al. | Feb. 9, 1954 |
| 2,749,277 | Johnston | June 5, 1956 |
| 2,794,727 | Barrons | June 4, 1957 |
| 2,801,160 | Iserson | July 30, 1957 |

FOREIGN PATENTS

| | | |
|---|---|---|
| 913,365 | France | Sept. 5, 1946 |

OTHER REFERENCES

Ahlgren et al.: "Principles of Weed Control," John Wiley & Sons, Inc., New York, 1951, pages 32, 33 and 69 to 71.

Bourcart: "Insecticides, Fungicides, and Weed Killers," 2nd edition, 1925, pages 12, 13 and 69.